(12) United States Patent
Tuffal et al.

(10) Patent No.: US 6,596,048 B1
(45) Date of Patent: Jul. 22, 2003

(54) DEVICE AND METHOD FOR THE CENTRIFUGING OF MINERAL FIBERS

(75) Inventors: Guy Tuffal, Suresnes (FR); Daniel Guyot, Rantigny (FR)

(73) Assignee: Isover Saint-Gobain, Courbevoie (FR)

( * ) Notice: Subject to any disclaimer, the term of this patent is extended or adjusted under 35 U.S.C. 154(b) by 0 days.

(21) Appl. No.: 09/719,160

(22) PCT Filed: Jun. 10, 1999

(86) PCT No.: PCT/FR99/01376

§ 371 (c)(1),
(2), (4) Date: Mar. 27, 2001

(87) PCT Pub. No.: WO99/65835

PCT Pub. Date: Dec. 23, 1999

(30) Foreign Application Priority Data

Jun. 12, 1998  (FR) ............................................. 98 07461

(51) Int. Cl.$^7$ ......................... B01D 39/20; C03B 37/04; D21H 13/40; D21H 17/00
(52) U.S. Cl. ......................... 55/527; 55/DIG. 5; 425/8; 264/8; 264/211.1; 65/459; 65/460; 65/521; 65/522; 65/524; 65/525; 65/528; 428/221; 428/325; 428/332
(58) Field of Search ............................ 55/527, DIG. 5; 65/459, 460, 521, 522, 524, 525, 528; 264/8, 211.1; 428/221, 325, 332; 425/8

(56) References Cited

U.S. PATENT DOCUMENTS

| | | | | | |
|---|---|---|---|---|---|
| 3,304,164 A | * | 2/1967 | Charpentier et al. | ........... | 65/522 |
| 4,058,386 A | * | 11/1977 | Faulkner et al. | ................ | 264/8 |
| 4,661,135 A | * | 4/1987 | Mosnier | ....................... | 65/523 |
| 4,689,061 A | * | 8/1987 | Britts et al. | .................... | 65/460 |
| 4,911,789 A | * | 3/1990 | Rieunier et al. | ............... | 55/527 |
| 5,154,746 A | * | 10/1992 | Okuma et al. | ................. | 65/460 |
| 5,277,706 A | * | 1/1994 | Blandin et al. | ................ | 65/521 |
| 5,326,241 A | * | 7/1994 | Rook et al. | ..................... | 264/8 |
| 5,779,760 A | * | 7/1998 | Watton et al. | ................. | 65/521 |

FOREIGN PATENT DOCUMENTS

| | | | | | |
|---|---|---|---|---|---|
| EP | 0 267 092 A | * | 5/1988 | ............. | D21H/5/18 |
| EP | 0 430 770 A | * | 6/1991 | ........... | D21H/13/40 |
| EP | 0 189 354 B | * | 4/1992 | ............ | C03B/37/04 |
| EP | 0 519 797 B | * | 11/1995 | ............ | C03B/37/04 |

\* cited by examiner

*Primary Examiner*—Duane Smith
*Assistant Examiner*—Jason M. Greene
(74) *Attorney, Agent, or Firm*—Oblon, Spivak, McClelland, Maier & Neustadt, P.C.

(57) ABSTRACT

The present invention relates to a device for the internal centrifugation of fine mineral fibres, a method for forming fine mineral fibres, and paper containing fine mineral fibres.

29 Claims, 2 Drawing Sheets

DEVICE AND METHOD FOR THE CENTRIFUGING OF MINERAL FIBERS

The invention is concerned with the manufacture of mineral fibres of the type comprising glass fibres of fine diameter, especially of at most 3 µm, for the purpose of incorporating them into papers used more particularly for producing aerosol filters or battery separators.

Specifically, the patents EP-0,267,092 and EP-0,430,770 disclose fibre-containing papermaking sheets for such uses. These fibres are usually a mixture of too types of fibre: "fine" fibres having a mean diameter of the order of at least 2 to 3 µm, and "very fine" fibres having a diameter lower than 1 µm. The first are intended, more particularly, for reinforcing the paper mechanically and giving it the necessary "bulk", whilst the second provide the porosity which gives it its filtration properties. As proposed in the two patents mentioned above, these two types of fibre may advantageously be obtained by means of a method called internal centrifuging which is widely used, moreover, for manufacturing fibres used to produced thermal or acoustic insulation products. In outline, this method involves introducing a stream of melted glass into a centrifuge, also called a fibre-forming disk, rotating at high speed and perforated on its periphery with a very large number of orifices, through which the glass is discharged in the form of filaments under the effect of the centrifugal force. These filaments are then subjected to the action of an annular drawing flow of high temperature and velocity which runs along the wall of the centrifuge and which thins them and converts them into fibres. The fibres formed are carried by this gaseous drawing flow towards a receiving device generally consisting of a gas-permeable band. This known method has undergone many improvements, including especially those taught in the patents BP-B-0,189,534 or EP-B-0,519,797.

For thermal or acoustic insulation, the fibres manufactured by means of such a method generally have a diameter greater than 3 µm, usually approximately 4 to 4.5 µm up to 12 µm: the method therefore cannot be used in its conventional operating parameters in order to obtain the "fine" or "very fine" fibres referred to above. Some adaptations are therefore necessary in order to obtain fine fibres by means of this method. Thus, the above mentioned patent EP-0,267,092 proposes, specifically, a particular selection of the velocity of the drawing gases in order to obtain the said fibres.

The object of the invention, then, is an improvement in the device and method for the formation of fibres by the internal centrifuging of fine mineral fibres of a diameter of at most 3 µm, the said improvement being aimed especially at the quality of the fibres obtained and/or the production yield of these.

The subject of the invention is, first of all, a device for the internal centrifuging of mineral fibres of a diameter below or equal to 3 µm, comprising a centrifuge equipped with a peripheral band perforated with orifices and which has a fibre-forming height below or equal to 35 mm, preferably below or equal to 32.5 or 30 mm, and, for example, between 16 and 32.5 mm.

Within the scope of the invention, the "fibre-forming height" of the centrifuge is defined by the distance separating the highest point of the peripheral band from the "lowest" orifices of the latter, "high" and "low" being understood with reference to the centrifuge arranged in the centrifuging position, that is to say along a substantially vertical axis (of rotation).

Conventionally, fibres of standard diameter for insulation are manufactured with the aid of centrifuges with a wide peripheral band having, to give an order of magnitude, a fibre-forming height of at least 40 mm. It is, in fact, expedient to select a considerable fibre-forming height, since this makes it possible to increase the number of orifices in the peripheral band and to have a large number of rows of orifices leading to an increase in the production capacity, often expressed by the "run-off" equal to the number of kg of glass fibres manufactured per day and per centrifuge. This reasoning has its limits, of course, since the production capacity is also linked to many other parameters and must not be obtained at the expense of too significant a quantity of unformed fibres, grains, risks of malfunctioning of the centrifuge, etc. Thus, it is also necessary, for example, to take into account the temperature gradients which may be established over the height of the peripheral band or the fact that the high-temperature drawing gases have or do not have the same impact on all the rows of orifices.

It became apparent that the quality of the so-called "fine" fibres, with a diameter of less than 3 µm, could be increased considerably by selecting a particular fibre-forming height below 35 to 30 mm or less, that is to say at values well below those used conventionally and those used hitherto to make so-called "fine" fibres of less than 3 µm. With such a type of centrifuge of lower height, it was possible to see that the "fine" fibres produced were much more stable dimensionally, with a much smaller quantity of defects of the type comprising unformed fibres/grains or of the type comprising amalgams of re-agglutinated fibres, and that they had highly satisfactory mechanical properties, especially in terms of yield strength under traction.

Moreover, the use of the centrifuge was simpler and less complicated than that encountered hitherto in the production of "fine" fibres. Furthermore, this increase in quality and this higher industrial feasibility were not obtained at the expense, of an economically unacceptable reduction in the production capacity, on the one hand because "fine" fibres of very particular use have a high added value and because it is also possible to have a production capacity a little lower than that obtained in the case of standard fibres, and, on the other hand, because it has been possible to limit at least partially the fall in production capacity by adjusting, especially increasing, the perforation density of the peripheral band.

Advantageously, the centrifuge according to the invention is selected with a mean diameter below or equal to 800 mm, especially of at least 200 mm, for example of approximately 200, 400 or 600 mm.

In order to obtain "fine" fibres with a diameter of at most 3 µm, it is preferable for the orifices of the centrifuge to have a diameter of at most 1.5 mm, for example at most 1.2 mm, especially in between 1.1 and 0.5 mm, for example between 0.9 and 0.7 mm (reference is made, here, to a "diameter", since these orifices are usually all selected circular, but it is not ruled out that the orifices are not circular, in which case "diameter" must be understood as meaning "largest dimension").

According to a preferred embodiment, the orifices of the peripheral band of the centrifuge are grouped in rows, conventionally rows arranged in concentric circles over the height of the band. In the invention, then, it is advantageous if at least two adjacent rows have orifices of different diameters, and, more precisely, if the rows, have decreasing orifice diameters from the top of the peripheral band downwards (usually, all the orifices of the same row have the same diameter). It is thus possible to provide, from the top downwards, n rows of orifices of a given diameter, then p rows of orifices of a smaller diameter, then t rows of orifices of an even smaller diameter, etc. With: n, p and t≧1.

An improvement in the fibre-forming quality was found when a kind of "gradient" decreasing from the top downwards in the size of orifices was established in this way. It was thus possible to reduce the differences in the way in which the filaments emanating from the highest rows were formed into fibres from those of the lowest rows; this "gradient" allows a development of the primary filaments at the outlet of the orifices and drawing which limits the path intersections, and therefore the impacts, between the fibres being drawn, which come from different rows of orifices, hence the increase in quality which is observed.

Preferably, the orifices of the centrifuge are grouped in rows spaced from one another at a distance of between 1 and 2 mm, especially between 1.2 and 1.8 mm, preferably with a pitch of offset from one row to another of between 1 and 2 mm, especially between 1.8 and 1.3 mm, and a spacing between two orifices of the same row of between 2.2 and 1.4 mm, especially between 2.1 and 1.6 mm.

Advantageously, the device according to the invention comprises a high-temperature gaseous drawing means in the form of an annular burner. It has thus proved particularly expedient, in controlling the production of "fine" fibres, to provide a means for channelling these high-temperature drawing gases and/or the mineral material ejected from the centrifuge and being converted from filaments into fibres, this means being in the form of a ring blowing non-hot gas, for example at ambient temperature. There may also be optionally be provided a means for the external heating of the walls of the centrifuge, especially in its lowest part, in the form of an annular inductor. All these elements are particularly described, in terms of their operating principle, in the above mentioned patents EP-0,189,354 and EP-0,519,797.

A heating means "within" the centrifuge, of the internal burner type, may also be used. This may perform various functions, especially that of terminating the thermal conditioning of the melted glass in the "basket" of the centrifuge (term explained below with the aid of the figures), of maintaining the reserve of glass in the centrifuge at a suitable temperature, and, finally, of continuously remelting the fibres liable to have been re-agglutinated on the outer walls of the centrifuge.

The "external" beating means of the annular-inductor type may advantageously be combined with this internal hem ring means, and it also makes it possible to control more effectively the temperature of the reserve of glass and the remelting of the re-agglutinated fibres. Specifically, it was found that, in general, for low run-offs, it was sufficient simply to employ an internal burner, whereas, for high run-offs, the annular inductor proved necessary, the internal burner optionally completing the latter in an advantageous way.

The subject of the invention is also a method for the formation of "fine" mineral fibres having a diameter below or equal to 3 $\mu$m by internal centrifuging associated with high-temperature gaseous drawing, especially using the device described above. According to this method, the material to be formed into fibres is poured into a centrifuge, the peripheral band of which is perforated with orifices, with a fibre-forming height (defined above) of the centrifuge of below or equal to 35 mm, especially of at most 32.5 mm, and advantageously of between 16 and 32.5 mm.

The centrifuge is advantageously that having the characteristics described above.

Hot gaseous drawing is advantageously carried out by means of an annular burner, the operating parameters of which may be selected in the following way:

the temperature of the gases at the burner outlet may preferably be not at at least 1350° C. especially at least 1400° C., and, for example, between 1400 and 1500° C., especially between 1430 and 1470° C. The temperature is subsequently adjusted as a function of the type of mineral fibre composition, depending above all on its viscosimetric behaviour. These temperature values have proved the most favourable for producing "fine" fibres, advantageously, the velocity of the gases emitted by the burner is also set at at least 200 m/s, (measured just at the outlet of the lips of the burner), especially at values of between 200 and 295 m/s, finally, the annular width of the gases at the burner outlet is preferably set at values of between 5 mm and 9 mm.

When the method of the invention employs a means for channeling the hot drawing gases and/or the material ejected from the orifices of the centrifuge under the effect of the centrifugal force, this means is advantageously a ring blowing the gas which is at most at ambient temperature and under a supply gas pressure of between 0.5 and $2.5.10^5$ Pa, especially 0.7 to $2.10^{-5}$ Pa.

In fact, within the context of the invention, the use of a blowing ring has proved particularly advantageous: its jets of "cold" air (usually at ambient temperature) have a cooling effect which is beneficial to the fibres being drawn, particularly where "fine" fibres relevant to the invention are concerned. Specifically, this cooling avoids "over-drawing" of the fibres and turbulence which tends to shorten them and embrittle than. It therefore contributes to ensuring that the fibres have good mechanical properties, this being all the more important since, here, the fibre-forming zone is of reduced height, as compared with fibre formation of standard dimension: thus, there is a clear, and advantageous, distinction between, on the one hand, the drawing zone subjected to the influence of the annular burner and the cooling zone subjected to the influence of the annular blower (the latter remains optional, however).

An inductor may be employed in order to heat the lowest zone of the centrifuge and avoid or limit the occurrence of a temperature gradient over the height of the centrifuge. However, since the centrifuge has a relatively low height here, the said inductor is merely optional. As mentioned above, an internal burner may also be employed cumulatively or alternatively.

The method according to the invention makes it possible to alternate production capacities perfectly compatible with the economic requirements, in view of the quality of the fibre obtained (for example, generally less than 1.5 to 2% by weight of grains/unformed fibres). It has thus been possible to obtain run-offs of fibres of a diameter of between 2 and 3 $\mu$m, for example 2.6 $\mu$m, of the order of 0.5 kg per day and per centrifuge orifice, thus corresponding to industrial run-offs of the order of 2500 to 7700 kg per day and per centrifuge for centrifuges of a mean diameter of 400 mm and a fibre-forming height of between 16 and 32.5 mm.

The subject of the invention is alto the use of the fibres obtained by means of the device and/or method described above, and having a diameter of at most 3 $\mu$m, in the manufacture of paper, especially for the purpose of producing filters or battery separators.

The subject of the invention is also paper incorporating these "fine" fibres of a diameter of at most 3 $\mu$m (usually between 2 and 3 $\mu$m, and "very fine" mineral fibres of a diameter of at most 1 $\mu$m (usually between 0.2 and 0.8 $\mu$m). Although the invention tends to refer to "fine" fibres., it is not ruled out that it also relates to the manufacture of "very fine" fibres.

Advantageously, the mass ratio between the two types of fibre is between 25/75 and 75/25, especially in the neighbourhood of 60/40 to 40/60.

BRIEF DESCRIPTION OF THE DRAWINGS

The invention will be explained in detail below with the aid of non-limiting examples illustrated by the following figures.

FIG. 1 thus illustrates a partial view of an internal centrifuge system with drawing by hot gas, adapted on the basis of those known from the prior art and described, in particular, in the patents EP-91,866, FP-189,354 and EP-519,797, to which reference will be made for more details on the general aspect of this fibre-forming procedure.

Figure 1:
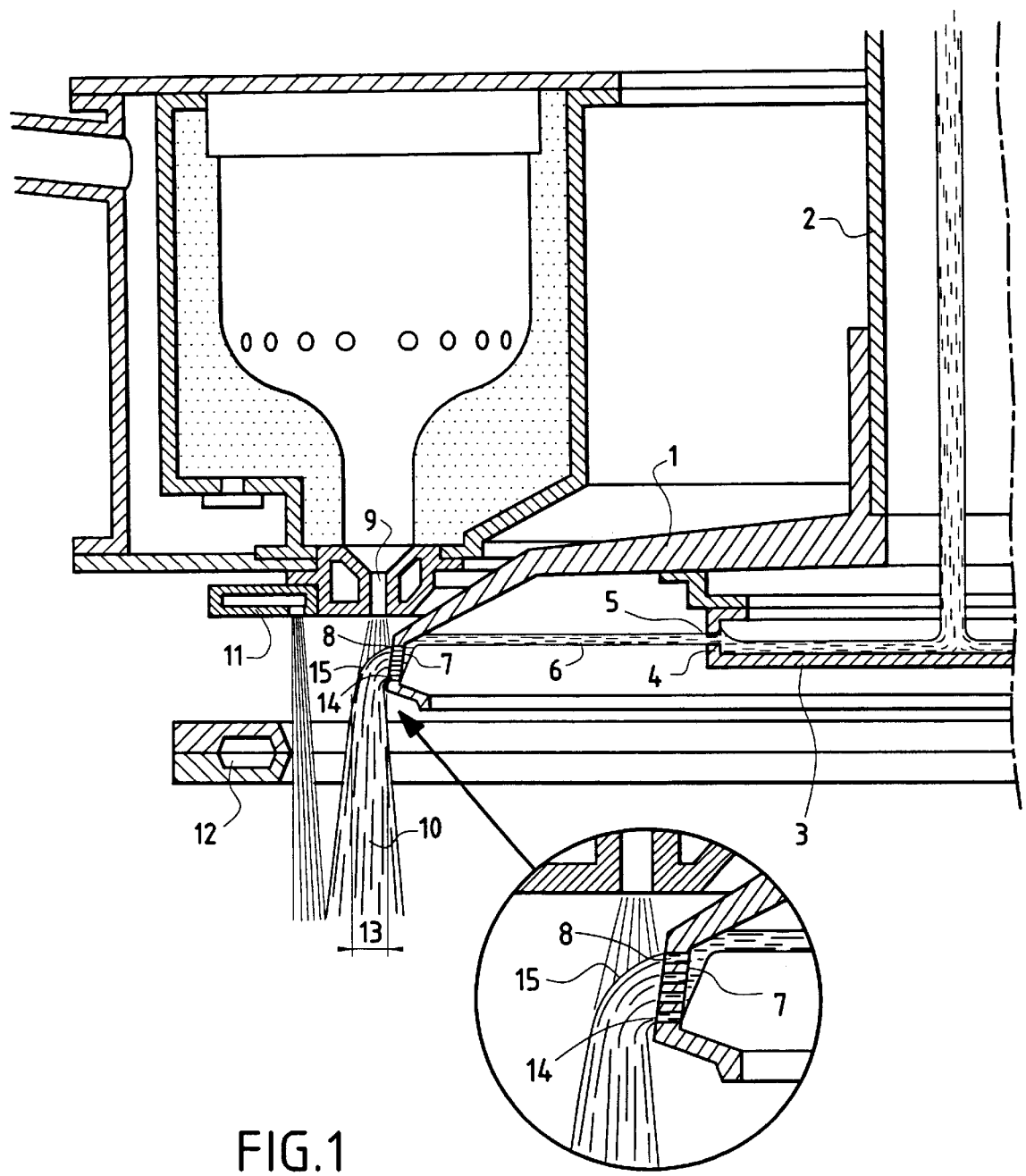
FIG. 1: a partial view of the centrifuging device according to the invention.

The system comprises a centrifuge 1 fastened on a shaft 2. The shaft and the centrifuge are driven in a rapid rotational movement by means of a motor (not illustrated). The shaft 2 is hollow, and the glass in the melted state flows from the feed means (not illustrated) into the shaft 2 as far as the "basket" 3, in which the melted glass spreads out. The basket 3 is likewise driven in rotation, in such a way that the malted glass is thrown onto the peripheral wall 4, which is perforated with orifices, and, from there, in the form of copious streams 6, onto the peripheral wall 7 of they centrifuge 1, the said streams forming on this wall a permanent reserve of melted glass which feeds the circular orifices 14 perforated in the said wall. This wall 7 is inclined at approximately 5 to 10° relative to the vertical. From the very numerous circular orifices 14 arranged in rows emerge flow cones 8 which are prolonged in the form of pre-fibres 15 projected into the annular gaseous flow emitted by the burner 9. Under the action of this flow, these pre-fibres are drawn, their end portion generating discontinuous fibres 10 which are subsequently collected under the centrifuge. The system comprises, furthermore, a blowing ring 11 which generates a "gas blanket" surrounding the annular gaseous flow generated by the burner 9. Use is also optionally made of an induction ring 12 under the centrifuge 1 and/or of an internal burner (not illustrated).

Under standard operating conditions, such a device makes it possible to obtain fibres of a mean diameter of at least 4 $\mu$m, especially of the order of 5 to 12 $\mu$m.

The invention therefore involves obtaining fibres satisfying the following criteria:
- a mean diameter of at most 3 $\mu$m, especially between 2.3 and 3 $\mu$m, for example centred on 2.6 or 2.8 or 3 $\mu$m,
- with a low fault rate (grains, unformed fibres, re-agglutinated fibres), especially of at most 2% by weight of fibres manufactured,
- with sufficiently high mechanical properties to ensure that they can reinforce papers in uses as filters or as battery separators, including, in particular, a tensile strength of at least 1.3 lb/inch, that is to say at least approximately 228 N/m, measured according to a standardized method on measuring equipment specific to the papermaking industry.
- with a satisfactory run-off for this type of fibre, especially of at least 0.5 kg of fibres per day and per centrifuge orifice.

Two types of glass compositions were tested, type "1" and type "2". The following table 1 indicates, for each of them, the percentages by weight of their components and the value of their temperature $T_{log3}$ in °C., which is the temperature of the compositions when their viscosity is equal, in poise, to log 3 (the $Fe_2O_3$ content corresponds to the total iron content of the composition, expressed in this oxidized form).

TABLE 1

|  | TYPE "1" | TYPE "2" |
|---|---|---|
| $SiO_2$ | 58.4 | 65.2 |
| $Al_2O_3$ | 5.8 | 3.5 |
| CaO | 1.9 | 5.9 |
| MgO | 0.4 | 2.7 |
| $Na_2O$ | 10 | 15.7 |
| $K_2O$ | 3 | 1 |
| $B_2O_3$ | 10.5 | 5.2 |
| BaO | 5 | — |
| ZnO | 4 | — |
| $Fe_2O_3$ | <0.2 | <0.2 |
| F | 0.6 | 0.6 |
| $T_{log3}$ | 1115° C. | 1065° C. |

Figure 2:
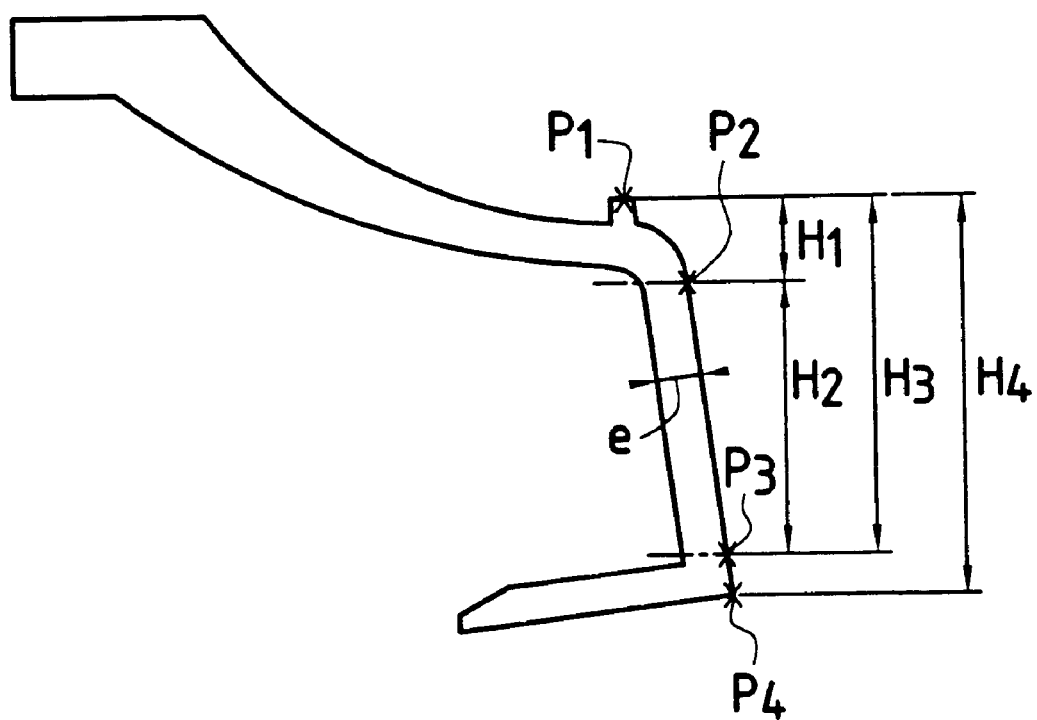
FIG. 2: a partial sectional view of the centrifuge according to FIG. 1.

The most significant adaptation carried out, within the scope of the invention, in order to achieve the objectives according to the invention related to the dimensions of the centrifuging disk, the sectional view of which was enlarged in FIG. 2.

The disks selected have a diameter 10 of 400 mm.

Their peripheral band is characterized by different dimensions, more particularly:
- the height of the first row of orifices $H_1$, measured between the highest point $P_1$ of the peripheral band and the level P2 of the first row,
- the perforation height $H_2$, corresponding to the distance separating the first row $P_2$ from the last row P3,
- the fibre-forming height $H_3$, corresponding to the distance between the highest point $P_1$ of the peripheral band and the last row P3,
- the total height $H_4$, corresponding to the distance between the highest point P1 and the lowest point P4 of the peripheral band.

Other parameters are also characteristic, especially
- the thickness e of the disk,
- the total number of orifices N,
- the pitch of offset of the orifices from one row to another,
- the number of orifices n per row
- the number of rows r
- the distribution of the orifice diameters according to the rows.

As regards the dimensions of the peripheral band, the most characteristic is $H_3$, that is to say the fibre-forming height. Here, it is reduced to values of between, for example, 16 and 32.5 mm.

The hollowing table 2 groups together examples of ranges of values for $H_1$, $H_2$, $H_3$, $H_4$, expressed in mm:

TABLE 2

| $H_1$ | 6–10 |
| $H_2$ | 10–25.5 |
| $H_3$ | 16–32.5 |
| $H_4$ | 20–36.5 |

The number of rows r may vary, for example, from 7 to 22 rows, especially 9 to 20 rows, especially with 600 to 770 orifices per row.

The total number of orifices N per disk may thus be 5000 to 16940 holes.

Advantageously, there is provision for the diameter of the orifices to be between 0.9 and 0.7 mm, with a diameter distribution per row such that the diameter of the orifices decreases from the top downwards. Thus, there may be 3 rows of orifices at 0.9 mm, then 3 rows of orifices at 0.8 mm, then 3 rows of orifices at 0.7 mm, from the top downwards, that is to say $n_1$ rows of diameter $d_1$, $n_2$ rows of diameter $d_2$, $n_i$ rows of diameter $d_i$, etc., generally with $n_1$, $n_2$, $n_i$, ... at least equal to 2, and $d_i > d_{i+1}$.

Such a decreasing gradient in the size of the orifices contributes to obtaining fibres of higher quality.

To complement the selection of the size of the centrifuges, the invention also related to adaptations of particular operating parameters.

Thus, it is preferable to select a high gas temperature at the outlet of the annular burner 9, which, however, is adjusted as a function of the hardness of the glass which is to be formed into fibres, evaluated, for example, in terms of its temperature $T_{log3}$: the temperature of the gases is selected, here, at around 1430° C. to 1470° C. for glasses of types 1 and 2.

It was also found that the combination of the gradient in the perforation of the orifices of the centrifuge with a special configuration of the centrifuge made it possible to obtain fibres having improved mechanical properties. This configuration involves, in particular, adjusting the height of the basket in the centrifuge in a suitable way, so that the basket preferably feeds the upper pert of the "reserve".

In conclusion, the modifications made to the method of internal centrifuging made it possible to obtain economically and industrially feasible high-quality fine fibres.

What is claimed is:

1. A device for the internal centrifuging of fine mineral fibres of a diameter below or equal to 3 µm, comprising
   a centrifuge equipped with a peripheral band perforated with orifices, wherein
   a fibre-forming height of the centrifuge is between 16 and 32.5 mm and
   the orifices of the centrifuge are grouped in rows, with at least two adjacent rows having different orifice diameters.

2. The device according to claim 1, wherein the orifices of the centrifuge are grouped in rows, with an orifice diameter per row which decreases from the top of the peripheral band of the centrifuge downwards in a centrifuging position.

3. The device according to claim 1, wherein the centrifuge has a mean diameter below or equal to 800 mm.

4. The device according to claim 1, wherein the diameter of at least some of the orifices of the centrifuge is at most 1.5 mm.

5. The device according to claim 1, wherein the orifices of the centrifuge are grouped in rows spaced from one another at a distance of between 1 and 2 mm with a pitch of offset from one row to another of between 1 and 2 mm and a spacing between two orifices of the same row of between 2.2 and 1.4 mm.

6. The device according to claim 1, further comprising at least one high-temperature gaseous means in the form of an annular burner.

7. The device according to claim 6, further comprising at least one means for channeling the high-temperature drawing gases, the mineral material ejected from the centrifuge, or both, the said means being in the form of a ring blowing gas at ambient temperature.

8. The device according to claim 1, further comprising a means for the external heating of the walls of the centrifuge in the form of an inductor, and internal heating means of an internal burner, or both.

9. A method, comprising
   internal centrifuging a material to be formed into fibres having a diameter below or equal to 3 µm with the device according to claim 1; and
   drawing with high-temperature gas.

10. The method according to claim 9, wherein the high-temperature gaseous drawing is carried out by means of an annular burner, with a gas temperature at the outlet of the burner of at least 1350° C.

11. The method according to claim 10, wherein the annular burner generates drawing gases having a velocity of at least 200 m/s with an annular width at the burner outlet of between 5 and 9 mm.

12. The method according to claim 9, further comprising channelling the high-temperature drawing gases, the material to be formed into fibres, or both, ejected from the centrifuge, with a ring blowing gas that is at not greater than ambient temperature, a supply gas pressure of which is between $0.5 \times 10^{-5}$ and $2 \times 10^5$ Pa.

13. The method according to claim 9, further comprising heating a lowest zone of the centrifuge by an external heating means of an inductor, an internal heating means of an internal burner, or both.

14. A paper, comprising mineral fibres of a diameter of at most 3 µm obtained by means of the device according to claim 1 and mineral fibres of a diameter of at most 1 µm.

15. The device of claim 3, wherein the centrifuge has a mean diameter of at least 200 mm.

16. The device of claim 4, wherein the diameter of at least some of the orifices of the centrifuge is at most 1.2 mm.

17. The device of claim 4, wherein the diameter of at least some of the orifices of the centrifuge is between 1.1 and 0.5 mm.

18. The device of claim 4, wherein the diameter of at least some of the orifices of the centrifuge is between 0.9 and 0.7 mm.

19. The device of claim 5, wherein the orifices of the centrifuge are grouped in rows spaced from one another at a distance of between 1.2 and 1.8 mm.

20. The device according to claim 5, wherein said pitch of offset from one row to another is between 1.3 and 1.8 mm.

21. The device of claim 5, wherein said spacing between two orifices of the same row is between 2.1 and 1.6 mm.

22. The method according to claim 10, wherein said gas temperature at the outlet of the burner is at least 1400° C.

23. The method of claim 10, wherein-said gas temperature at the outlet of the burner is between 1400–1500° C.

24. The method of claim 11, wherein the annular burner generates drawing gases having a velocity of between 200 and 295 m/s.

25. The paper of claim 14, wherein the mineral fibres are of a diameter of 2 to 3 µm.

26. A method of manufacturing paper, comprising
   producing fine mineral fibres of a diameter below or equal to 3 µm with the device according to claim 1.

27. The method according to claim 26 wherein the paper is a filter.

28. The method according to claim 26, wherein the paper is a battery separator element.

29. The method according to claim 9, further comprising pouring the material to be formed into the centrifuge.

* * * * *